(12) United States Patent
Cheng et al.

(10) Patent No.: US 9,817,271 B2
(45) Date of Patent: Nov. 14, 2017

(54) DISPLAY PANEL (71) Applicant: Innolux Corporation, Miao-Li County (TW)

(72) Inventors: Chu-Chun Cheng, Miao-Li County (TW); Yu-Ju Chen, Miao-Li County (TW); I-Hua Huang, Miao-Li County (TW); Wan-Shan Yang, Miao-Li County (TW); Chun-Teng Chen, Miao-Li County (TW); Chen-Kuan Kao, Miao-Li County (TW); Kuei-Ling Liu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 350 days.

(21) Appl. No.: 14/592,926

(22) Filed: Jan. 9, 2015

(65) Prior Publication Data
US 2015/0198826 A1 Jul. 16, 2015

(30) Foreign Application Priority Data

Jan. 15, 2014 (TW) .............................. 103101396 A
Jun. 4, 2014 (TW) .............................. 103119348 A (51) Int. Cl.
*G02F 1/1337* (2006.01)
*G02F 1/1339* (2006.01)
(Continued)

(52) U.S. Cl.
CPC .. *G02F 1/133707* (2013.01); *G02F 1/133512* (2013.01); *G02F 1/1339* (2013.01);
(Continued)

(58) Field of Classification Search
CPC .......................................... G02F 2001/133776
(Continued)

(56) References Cited

U.S. PATENT DOCUMENTS 6,466,294 B1 * 10/2002 Yamagishi ............ G02F 1/1339
29/830
6,480,255 B2 11/2002 Hoshino et al.
(Continued)

FOREIGN PATENT DOCUMENTS

JP 2000194013 A 7/2000
TW 200611042 A 4/2006
(Continued)

OTHER PUBLICATIONS

Partial EP Search report dated Jul. 22, 2014.
(Continued)

*Primary Examiner* — Wen-Ying P Chen
(74) *Attorney, Agent, or Firm* — McClure, Qualey & Rodack, LLP (57) ABSTRACT A display panel is provided. The display panel includes a first substrate, a second substrate, a liquid crystal layer, a plurality of thin film transistors, a plurality of metal wires, a protection layer, a first alignment layer, and a plurality of agglomerates. The first substrate has at least a display area and a non-display area located outside the display area. The second substrate is disposed opposite to the first substrate. The liquid crystal layer is disposed between the first substrate and the second substrate. The thin film transistors and the metal wires are disposed on the first substrate, the protection layer overlaying at least a portion of the metal wires. The first alignment layer is disposed on the protection layer for exposing a first surface of the protection layer. The agglomerates are disposed on at least a portion of the first surface.

19 Claims, 5 Drawing Sheets (51) Int. Cl.
*G02F 1/1333* (2006.01)
*G02F 1/1335* (2006.01)

(52) U.S. Cl.
CPC ............ *G02F 2001/133388* (2013.01); *G02F 2001/133776* (2013.01); *G02F 2202/36* (2013.01)

(58) Field of Classification Search
USPC ........................................................ 349/125
See application file for complete search history.

(56) References Cited

U.S. PATENT DOCUMENTS

| | | | |
|---|---|---|---|
| 7,643,108 B2 | 1/2010 | Huang et al. | |
| 8,072,562 B2 | 12/2011 | Hsu et al. | |
| 2001/0050747 A1 | 12/2001 | Hoshino et al. | |
| 2002/0033927 A1* | 3/2002 | Mun | G02F 1/133707 349/156 |
| 2003/0151703 A1* | 8/2003 | Nakanishi | G02F 1/133707 349/86 |
| 2005/0117093 A1 | 6/2005 | Kim et al. | |
| 2007/0182874 A1* | 8/2007 | Kamijima | G02F 1/136209 349/44 |
| 2008/0252807 A1 | 10/2008 | Huang et al. | |
| 2010/0188623 A1 | 7/2010 | Nakagawa | |
| 2011/0141413 A1 | 6/2011 | Sakai et al. | |

FOREIGN PATENT DOCUMENTS

| | | |
|---|---|---|
| TW | 200717093 A | 5/2007 |
| TW | 200841103 | 10/2008 |
| TW | 201011420 | 3/2010 |

OTHER PUBLICATIONS

EP Search report dated Nov. 10, 2014.
Hanaoka, et al.: "40.1: A New MVA-LCD by Polymer Sustained Alignment Technology"; SID 04 Digest; Copyright 2004; pp. 1200-1203.
KIPO Office Action dated Nov. 18, 2015 in corresponding application (No. 10-2015-0006339).
TIPO Office Action dated Oct. 26, 2015 in corresponding Taiwan application (No. 103119348).
TW Office Action dated Jun. 22, 2015 in corresponding Taiwan application (No. 103101396).

* cited by examiner

DISPLAY PANEL

This application claims the benefits of Taiwan application Serial No. 103101396, filed Jan. 15, 2014, and Taiwan application Serial No. 103119348, filed Jun. 4, 2014 the subject matters of which are incorporated herein by reference.

BACKGROUND OF THE INVENTION

Field of the Invention

The disclosure is related in general to a display panel, and particularly to a display panel having superior display quality.

Description of the Related Art

Liquid crystal displays have been widely applied in a variety of electronic products, such as laptops, tablet PCs, and etc. Moreover, along with the rapid advance of large-sized flat panel displays in the market, liquid crystal displays with light weight and miniaturized sizes have played very important roles and gradually replaced CRT displays to become the main stream in the market.

Currently, vertical alignment liquid crystal display panels are one of the main stream products. However, vertical alignment liquid crystal display panels have issues of light leakage, which affect the display quality thereof. Therefore, researchers have been working on providing vertical alignment liquid crystal display panels having superior display quality.

SUMMARY OF THE INVENTION

The disclosure is directed to a display panel. In the embodiments, the agglomerates located corresponding to the non-display region of the display panel do not have any specific alignment direction, such that the liquid crystals in the region do not tilt toward any specific direction, and the light transmittance of the non-display region is lowered; accordingly, the light leakage of the display panel is reduced, and the qualities of the display images are improved.

According to an embodiment of the present disclosure, a display panel is provided. The display panel includes a first substrate, a second substrate, a liquid crystal layer, a plurality of thin film transistors, a plurality of metal wires, a protection layer, a first alignment layer, and a plurality of agglomerates. The first substrate has at least a display area and a non-display area located outside the display area. The second substrate is disposed opposite to the first substrate. The liquid crystal layer is disposed between the first substrate and the second substrate. The thin film transistors and the metal wires are disposed on the first substrate, the protection layer overlaying at least a portion of the metal wires. The first alignment layer is disposed on the protection layer for exposing a first surface of the protection layer. The agglomerates are disposed on at least a portion of the first surface.

The above and other aspects of the invention will become better understood with regard to the following detailed description of the preferred but non-limiting embodiment(s). The following description is made with reference to the accompanying drawings.

DETAILED DESCRIPTION OF THE INVENTION

According to the embodiments of the present disclosure, the agglomerates located corresponding to the non-display region provide a better alignment function (ex. vertical alignment) for the liquid crystal molecules in the liquid crystal layer, such that recovery of the liquid crystal molecules is faster when the liquid crystal molecules are under external force operations, the light leakage is reduced, and hence the qualities of the display images are improved. The embodiments are described in details with reference to the accompanying drawings. The identical elements of the embodiments are designated with the same or similar reference numerals. Also, it is to be noted that the drawings may be simplified for illustrating the embodiments. Thus, the specification and the drawings are to be regard as an illustrative sense rather than a restrictive sense. The details of the structures of the embodiments are for exemplification only, not for limiting the scope of protection of the disclosure. Detailed structures may be modified or changed by one skilled in the art after having the benefit of this description of the disclosure.

Figure 1A:
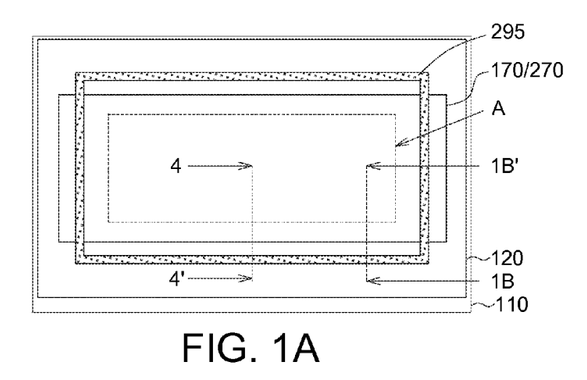
FIG. 1A shows a top view of a display panel according to an embodiment of the present disclosure.
Figure 1B:
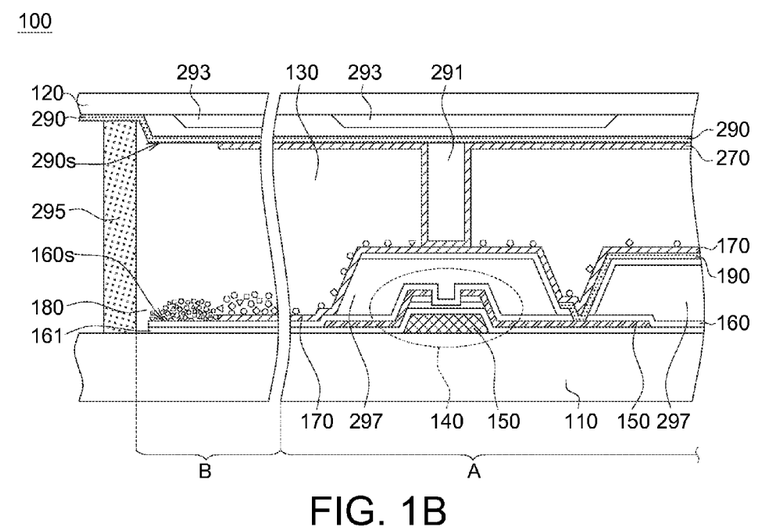
FIG. 1B shows a cross-sectional view along the cross-sectional line 1B-1B' of FIG. 1A.

FIG. 1A shows a top view of a display panel 100 according to an embodiment of the present disclosure, and FIG. 1B shows a cross-sectional view along the cross-sectional line 1B-1B' of FIG. 1A. Referring to FIGS. 1A-1B, the display panel 100 includes a first substrate 110, a second substrate 120, a liquid crystal layer 130, a plurality of thin film transistors 140, a plurality of metal wires 150, at least a protection layer (e.g. a first protection layer 160 and a second protection layer 161), a first alignment layer 170, and a plurality of agglomerates 180. The first substrate 110 has at least a display region A and a non-display region B located outside the display region A. The second substrate 120 is disposed opposite to the first substrate 110. The liquid crystal layer 130 is disposed between the first substrate 110 and the second substrate 120. The thin film transistors 140 and the metal wires 150 are disposed on the first substrate 110. The first protection layer 160 and the second protection layer 161 overlay at least a portion of the metal wires 150. The first protection layer 160 is disposed on the second protection layer 161, and the first protection layer 160 covers the thin film transistors 140 and the metal wires 150. The first alignment layer 170 is disposed on the first protection layer 160, and the first alignment layer 170 partially covers the first protection layer 160 for exposing a first surface 160s of the first protection layer 160. The agglomerates 180 are disposed on at least a portion of the first surface 160s. In another embodiment, the first protection layer 160 partially covers the second protection layer 161 for exposing a partial surface of the second protection layer 161, and the agglomerates 180 are disposed on at least the exposed partial surface (not shown) of the second protection layer 161. In a further embodiment, the first protection layer 160 partially covers the second protection layer 161 for exposing a partial surface (not shown) of the second protection layer 161, and the agglomerates 180 are disposed on the first protection layer 160 and on the exposed partial surface of the second protection layer 161.

The display region A represents the area of the display panel 100 for displaying images, and the non-display region B represents the area not for displaying images. In an embodiment, as shown in FIG. 1A, the non-display region B surrounds the display region A. In the embodiment, the display region A is such as the area in the pixel region for displaying images, and the non-display region B is such as a fan out area, but not limited thereto. The non-display region B may include any area not for displaying images.

In the embodiment, the first protection layer 160 is in direct contact with at least one of the thin film transistors 140 or the metal wires 150. As shown in FIG. 1B, in the present embodiment, the first protection layer 160 is in direct contact with the thin film transistors 140 and the metal wires 150.

In the embodiment, the first protection layer 160 and the second protection layer 161 may independently include an inorganic dielectric material, such as $SiN_x$, $SiO_x$, and/or $SiO_xN_y$. As shown in FIG. 1B, the first surface 160s of the first protection layer 160, which is exposed from the first alignment layer 170, is corresponding to the non-display region B.

In the embodiment, the agglomerates 180 in the non-display region B do not have any specific arrangement or alignment direction. In other words, the agglomerates 180 are arranged irregularly above the first substrate 110. The agglomerates 180 in the display region A have functions of specific alignment direction(s) for directing the liquid crystals to tilt toward specific direction(s). In the manufacturing process, the irradiation solidification processes may vary and an electrical field may be applied or not depending on the regions where the agglomerates 180 are located; accordingly, the agglomerates 180 with different functions may be formed in different regions. Therefore, the agglomerates 180 located in the non-display region B provide a better vertical alignment for the liquid crystal molecules in the liquid crystal layer 130, such that recovery is faster when the liquid crystal molecules are under external force operations, the light leakage of the display panel 100 is reduced, and hence the qualities of the display images are improved.

In the embodiment, the agglomerates 180 are in direct contact with the liquid crystal molecules in the liquid crystal layer 130. It is to be noted that the sizes and ratios of the agglomerates 180 in the drawings may not be necessarily drawn to scale, that is, the drawings are to be regard as an illustrative sense for illustrating the embodiments rather than a restrictive sense.

In the embodiment, there may be a variety of ways to form the agglomerates 180. For example, in an embodiment, UV curable monomers may be added in the process of forming the liquid crystal layer 130 or in the process of forming the first alignment layer 170, and then UV irradiation is performed from the first substrate 110 side or the from the second substrate 120 side, for forming the agglomerates 180 on the first substrate 110 (that is, the at least a portion of the first surface 160s of the first protection layer 160 exposed form the first alignment layer 170) or on the first alignment layer 170. The material of the agglomerates 180 formed from irradiation polymerization of UV curable monomers is polymer, and the reaction conditions may differ in different regions.

In an embodiment, the display panel 100 is such as a nano-protrusion vertical aligned liquid crystal display panel, and the agglomerates 180 and the nano-protrusion structures on the surface of the first alignment layer 170 may be formed from the same monomer raw materials. For example, the monomers in the display region A are polymerized with a continuously applied external electrical field to form alignment nano-protrusion structures; while monomers in the non-display region B are polymerized without applying any external electrical field to form the agglomerates 180, which have no alignment function for directing specific tilt directions and are arranged irregularly. As such, the alignment nano-protrusion structures in the display region A may help the liquid crystal molecules to have specific alignment direction(s), and the agglomerates 180 located in the non-display region B provide a better vertical alignment for the liquid crystal molecules in the liquid crystal layer 130, such that recovery of the liquid crystal molecules is faster when the liquid crystal molecules are under external force operations, the light leakage of the display panel 100 is reduced, and hence the qualities of the display images are improved.

The above-mentioned alignment nano-protrusion structures and the agglomerates 180 may be formed by a variety of manufacturing methods. For example, the electrode may be patterned, such that the patterned electrode is not located on the area of the substrate corresponding to the non-display region B, and thus the monomers in the non-display region B are not influenced by the electrical field. Alternatively, a patterned mask may be used to cover the non-display region B while UV irradiation is performed with a continuously applied electrical field, and polymerization of the monomers in the non-display region B by UV irradiation is performed after the electrical field is removed.

As shown in FIG. 1B, in the embodiment, the display panel 100 may further include a plurality of photo spacers 291. The photo spacers 291 are disposed between the first substrate 110 and the second substrate 120 for providing a gap for disposing the liquid crystal layer 130. Different photo spacers 291 may have different heights for providing buffer when the panel is compressed.

In the embodiment, as shown in FIG. 1B, the display panel 100 may include an electrode layer 190 formed on at least a portion of the first substrate 110. The electrode layer 190 is such as a patterned electrode layer. As shown in FIG. 1B, the display panel 100 may further include another electrode layer 290 disposed on the second substrate 120.

Moreover, the display panel 100 may further include a second alignment layer 270 disposed on the electrode layer 290, and a second surface 290s of the electrode layer 290 is exposed from the second alignment layer 270. The agglomerates 180 may be further disposed on at least a portion of the second surface 290s, that is, the exposed second surface 290s of the electrode layer 290. In the embodiment, the electrode layer 290 on the second substrate 120 may be a patterned light-transmitting electrode layer or a full flat light-transmitting electrode layer, and the material of the electrode layer may be ITO or IZO.

In the embodiment, the first alignment layer 170 and the second alignment layer 270 may be, for example, polyimide (PI) films.

In the embodiment, as shown in FIG. 1B, the display panel 100 may further include a seal 295. The seal 295 is disposed between the first substrate 110 and the second substrate 120 and located in a periphery area of the non-display region B.

As shown in FIGS. 1A-1B, in the embodiment, the first alignment layer 170 does not fully cover the region within the seal 295. Compare to the case where the first alignment layer 170 fully covers the first substrate 110, and the whole seal 295 is adhered to the first alignment layer 170, due to the poor adhesion between the seal 295 and the first alignment layer 170, peelings of layers may easily occur. Accordingly to the embodiments of the present disclosure, since the first alignment layer 170 partially overlies above the first substrate 110, such that at least a portion of the seal 295 can be adhered to the material with a higher adhesion on the first substrate 110, as such, the peelings of layers of the display panel 110 can be reduced.

Under such circumstance, the agglomerates 180 are also located on the first surface 160s of the first protection layer 160 exposed from the first alignment layer 170. The agglomerates 180 located in the non-display region B provide a better vertical alignment for the liquid crystal molecules in the liquid crystal layer 130, such that recovery is faster when the liquid crystal molecules are under external force operations, the light leakage of the display panel 100 is reduced, and hence the qualities of the display images are improved.

In the embodiment, as shown in FIG. 1B, the display panel 100 may further includes a color filter layer 297 disposed on the first substrate 110. In an alternative embodiment, the color filter layer may also be disposed on the second substrate 120 (not shown).

Figure 2:
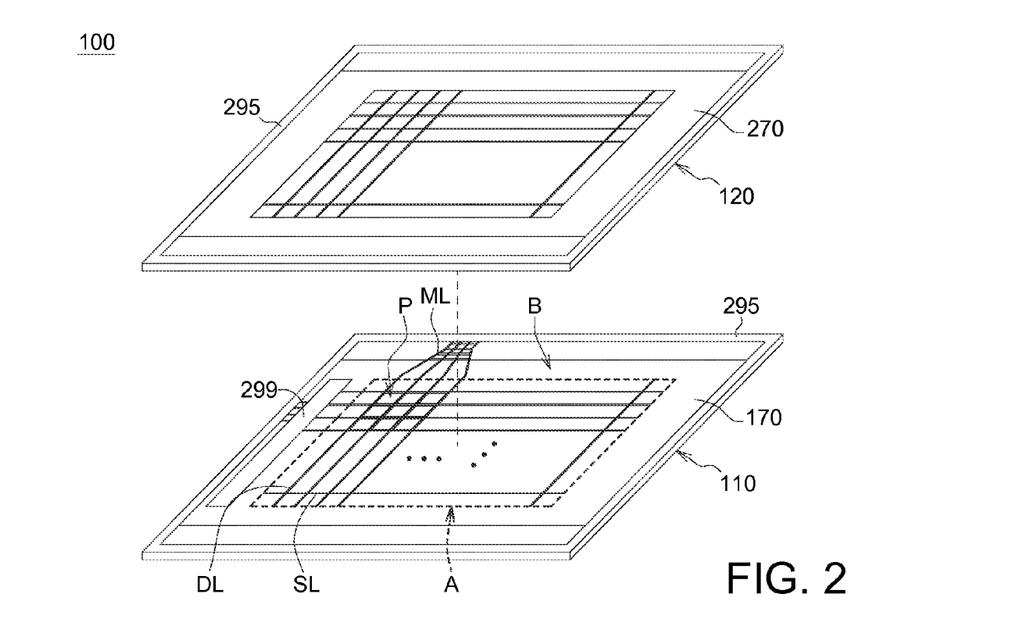
FIG. 2 shows a simplified explosion diagram of a display panel according to an embodiment of the present disclosure.

FIG. 2 shows a simplified explosion diagram of the display panel 100 according to an embodiment of the present disclosure. It is to be noted that some elements in FIG. 2 may be omitted or simplified for illustrating the embodiments, and the sizes and ratios of the elements in the drawings may not be necessarily drawn to scale, that is, the drawings are to be regard as an illustrative sense rather than a restrictive sense. In the present embodiment, the seal 295 is adjacent to (or aligned with) the sides of the substrates 110/120. In another embodiment, the seal 295 may not be necessarily adjacent to the sides of the substrates 110/120. Alternatively, the seal 295 may be only adjacent to three sides of the substrate 110 and not be adjacent to the last one side of the substrate 110.

In the embodiment, the display panel 100 may further include at least a data line DL and at least a scan line SL. The display region A has a plurality of pixels P. The data lines DL and the scan line SL intersect to define the pixel areas P. A plurality of metal wires ML are further disposed in the non-display region B, wherein some of the metal wires ML and the scan lines SL belong to the same layer of metal or are formed in the same manufacturing process, and some of the metal wires ML and the data lines DL belong to the same layer of metal or are formed in the same manufacturing process. Referring to FIGS. 1B and 2, some of the metal wires ML may be disposed below the second protection layer 161, and some of the metal wires ML may be disposed below the first protection layer 160. However, the arrangement of the metal wires ML may be different from the arrangements as shown in FIGS. 1B-2, depending on the design needs.

Referring to FIGS. 1B and 2, the display panel 100 may further include a light shielding layer 293. In the embodiment, the light shielding layer 293 is such as a black matrix (BM), which is disposed on the second substrate 120. In the embodiment, a driver on panel 299 may be further disposed in the non-display region B, and the driver on panel 299 may be a gate on panel (GOP) or a data driver circuit. The GOP or the data driver circuit may be disposed simultaneously or separately on the panel. In the drawing, only one set of GOP is shown. However, more than one GOP or date driver may be disposed as well, depending on the design needs.

Figure 3:
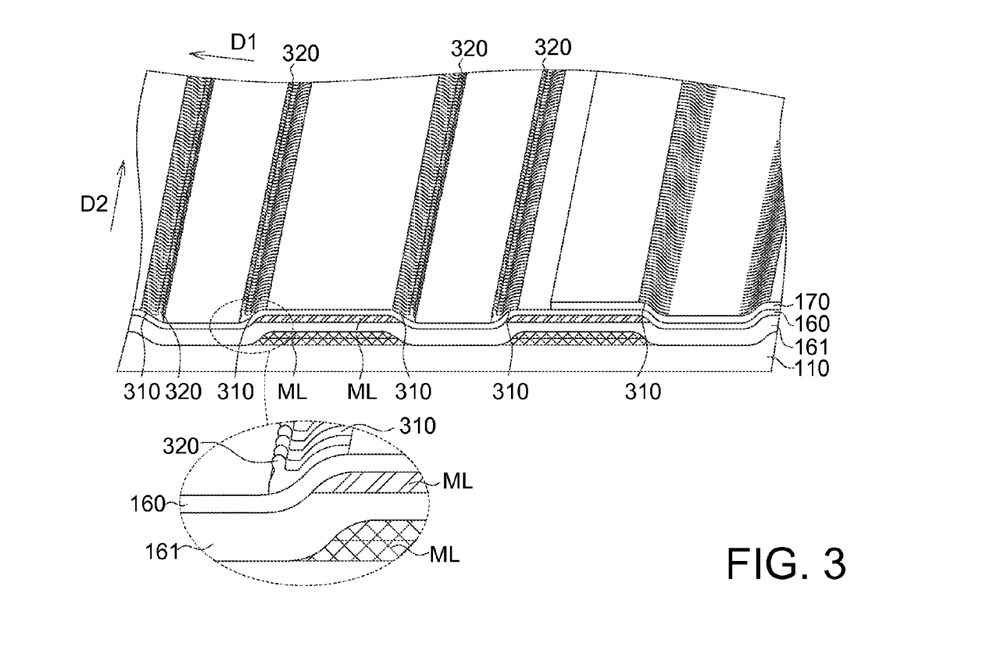
FIG. 3 shows a partial stereoscopic diagram of metal wires located in the non-display region as shown in FIG. 2.

FIG. 3 shows a partial stereoscopic diagram of metal wires ML located in the non-display region B as shown in FIG. 2.

In an embodiment, as shown in FIG. 3, the display panel 100 may further have a plurality of nanogrooves 310. The nanogrooves 310 are disposed on a side of at least one of the metal wires ML in the non-display region B. As shown in FIG. 3, the nanogrooves 310 are disposed on at least an inclined surface of the metal wires ML. In the embodiment, the nanogrooves 310 may also be formed on the inclined surfaces of two sides of one metal wire ML in the non-display region B. In the embodiment, the nanogrooves 310 may be further formed in the region with an alignment layer and the region without an alignment layer in the non-display region B. In the embodiment, as shown in FIG. 3, the extending direction D1 of the nanogrooves 310 intersects with the extending direction D2 of the metal wires ML, forming an angle. In an embodiment, the angle is, for example, about 90°.

In general, the metal wires ML in the non-display region B may easily reflect lights. According to the embodiments of the present disclosure, the nanogrooves 310 located on a side of the metal wires ML, particularly on an inclined surface of the metal wires ML, can reduce the reflection of lights by the metal wires ML, and the brightness of the region can be further reduced, forming an excellent dark region (disclination region). Moreover, the reduction of light leakage can be improved. In other embodiments, the metal wires ML may be provided with different types of arrangements and are not limited to the metal wires with line shapes.

In an embodiment, as shown in FIG. 3, the display panel 100 may further include a plurality of submicron protrusions 320. The submicron protrusions 320 are disposed in the non-display region B. The submicron protrusions 320 are arranged along the extending direction D2 of at least one of the metal wires ML. In other words, the submicron protrusions 320 grow along the extending direction D2 of the metal wires ML. In an embodiment, the submicron protrusions 320 may be arranged parallel to the edge of the metal wires ML. In another embodiment, the submicron protrusions 320 may be formed on an inclined surface of the metal wires ML as well. The submicron protrusions 320 have a size of about less than 1 μm. In the embodiment, the submicron protrusions 320 are located in the area without an alignment layer in the non-display region B, and the submicron protrusions 320 may be located in an exposed area on the first surface 160s of the first protection layer 160.

In the non-display region B, especially in the area without any alignment layer, the submicron protrusions 320 are arranged along the extending direction D2 of the metal wires ML, such that the edge of the metal wires ML is less smooth and straight, which lowers the reflection of lights by the metal wires ML. Accordingly, the brightness of the region can be reduced, forming an excellent dark region (disclination region), and the reduction of light leakage can be improved.

Figure 4:
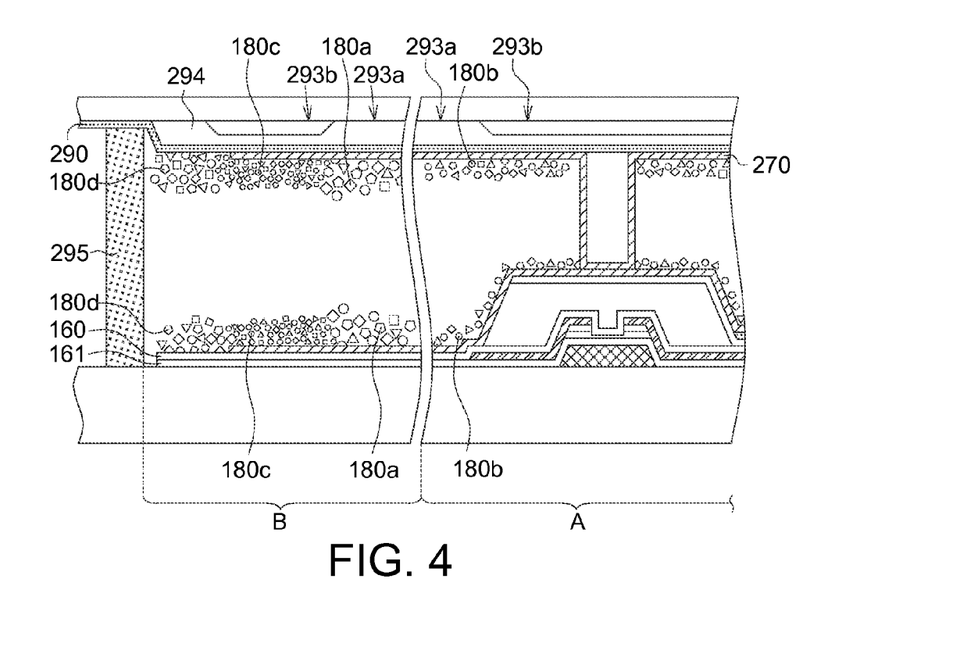
FIG. 4 shows a cross-sectional view of a display panel along the cross-sectional line 4-4' of FIG. 1A according to another embodiment of the present disclosure.

FIG. 4 shows a cross-sectional view of a display panel along the cross-sectional line 4-4' of FIG. 1A according to another embodiment of the present disclosure. In an embodiment, as shown in FIG. 4, the light shielding layer 293 is disposed on the second substrate 120, and at least a portion of the light shielding layer 293 is corresponding to the non-display region B. The light shielding layer 293 has a light transmitting portion 293a and a light shielding portion 293b, and agglomerates are formed where corresponding to the light transmitting portion 293a and where corresponding to the light shielding portion 293b. The light transmitting portion 293a of the light shielding layer 293 is used for making the UV irradiation solidification reaction of the agglomerates 180 more complete. In the embodiment, the agglomerates are formed above the first substrate 110, and the agglomerates may be further formed above the second substrate 120; accordingly, the surface roughness on the first substrate 110 and the surface roughness on the second substrate 120 are generated from the agglomerates. The morphologies corresponding to different roughnesses have different influences on the tilt of liquid crystals, and the morphology with a larger roughness has a greater influence on the liquid crystals. As to in which way the roughness influences the tilt of liquid crystals and how it works, it depends on the different characteristics of agglomerates in different regions as well as the range of the regions influenced by the operating voltage. The roughness being high or low may be controlled by a gray tone mask or by adjusting the irradiation level and time duration of the display region A and the non-display region B, respectively, with a mask.

As shown in FIG. 4, in the embodiment, a first surface roughness is generated from the agglomerates 180a corresponding to the light transmitting portion 293a, and a second surface roughness is generated from the agglomerates 180c corresponding to the light shielding portion 293b. The first surface roughness is higher than the second surface roughness. In an embodiment, the first surface roughness and the second surface roughness may represent a surface roughness on the first substrate 110 and a surface roughness on the second substrate 120.

As shown in FIG. 4, a third surface roughness is generated from the agglomerates 180b corresponding to the display region A. In the embodiment, the first surface roughness is higher than the third surface roughness, and the third surface toughness is higher than the second surface roughness. In an embodiment, the first surface roughness, the second surface roughness, and the third surface roughness may represent a surface roughness on the second substrate 120.

As shown in FIG. 4, a fourth surface roughness is generated from the agglomerates 180d correspondingly adjacent to the seal 295. The fourth surface roughness is higher than the third surface roughness. In an embodiment, the third surface roughness and the fourth surface roughness may represent a surface roughness on the first substrate 110.

In the above-mentioned embodiments, the first surface roughness, the second surface roughness, the third surface roughness, and the fourth surface roughness may be at least one of rough-mean-square roughness, average roughness, or maximum roughness. In an embodiment, the first surface roughness, the second surface roughness, the third surface roughness, and the fourth surface roughness may be represented as average roughness.

Further illustration is provided with the following embodiments. Below are the results of roughness measured from several different regions of the display panel 100 for illustrating the properties of the display panel 100 according to the embodiments of the present disclosure. However, the following embodiments are for the purpose of elaboration only, not for limiting the scope of protection of the invention. The measured results of roughness of the regions are shown in Table 1, wherein the measured roughnesses include root-mean-square roughness (Rq), average roughness (Ra), and maximum roughness (Rmax). The values as shown in Table 1 are measured by AFM (VEECO Dimension-icon) within a selected area of 5*5 square microns ($\mu m^2$) of each of the samples.

TABLE 1

|  | Light transmitting portion 293a (the first surface roughness) | Light shielding portion 293b (the second surface roughness) | Display region A (the third surface roughness) |
|---|---|---|---|
| Root-mean-square roughness Rq (nm) | 27.3 | 18.7 | 20.6 |
| Average roughness Ra (nm) | 20.7 | 14.1 | 15.8 |
| Maximum roughness Rmax (nm) | 270 | 168 | 172 |

As shown in Table 1, the average roughness (Ra=20.7 nm) generated from the agglomerates corresponding to the light transmitting portion 293a is higher than the average roughness (Ra=14.1 nm) generated from the agglomerates corresponding to the light shielding portion 293b. Moreover, the average roughness (Ra=15.8 nm) generated from the agglomerates corresponding to the display region A is higher than the average roughness (Ra=14.1 nm) generated from the agglomerates corresponding to the light shielding portion 293b. In other words, the average roughness (the first average roughness) of the light transmitting portion 293a is the highest, followed by the average roughness the third average roughness) of the display region A, and the average roughness (the second average roughness) of the light shielding portion 293b is lower than that of the above-mentioned two regions.

In addition, the root-mean-square roughness (Rq=27.3 nm) and the maximum roughness (Rmax=270 nm) generated from the agglomerates corresponding to the light transmitting portion 293a of the non-display region B are higher than the root-mean-square roughness (Rq=18.7 nm) and the maximum roughness (Rmax=168 nm) generated from the agglomerates corresponding to the light shielding portion 293b of the non-display region B, respectively. Moreover, the root-mean-square roughness (Rq=20.6 nm) and the maximum roughness (Rmax=172 nm) generated from the agglomerates corresponding to the display region A are higher than the root-mean-square roughness (Rq=18.7 nm) and the maximum roughness (Rmax=168 nm) generated from the agglomerates corresponding to the light shielding portion 293b, respectively. Therefore, different from the display region A which is applied by a pixel operation voltage, in the non-display region B, the roughness of the morphology formed from the agglomerates of the light transmitting portion 293a can increase the influence on liquid crystals, such that the agglomerates 180 located in the non-display region B provide a better vertical alignment function for the liquid crystal molecules in the liquid crystal layer 130, thereby recovery is faster when the liquid crystal molecules are under external force operations, the light leakage of the display panel 100 is reduced, and hence the qualities of the display images are improved. On the other hand, since lights are shielded in the light shielding portion 293b, the roughness of the morphology formed from the agglomerates of the light shielding portion 293b is lower than that of the light transmitting portion 293a. In addition, since the pixel operation voltage is applied to the display region A in a display mode, the roughness of the display region A is lower than that of the light transmitting portion 293a of the non-display region B. Accordingly, the roughness (the first root-mean-square roughness, the first maximum roughness) is the highest, the roughness of the display region A (the third root-mean-square roughness, the third maximum roughness) is the second highest, and the roughness of the light shielding portion 293b is lower than those of the above-mentioned two regions. Regarding the fourth surface roughness adjacent to the seal 295, since the angle of light irradiation when the seal 295 is solidified can be adjusted, the surface referring to the fourth surface roughness can be influenced by more light irradiation, and the time duration of the light irradiation of the surface referring to the fourth surface roughness is longer than that of other regions; as a result, the fourth surface roughness is higher than that of other surfaces.

Figure 5:
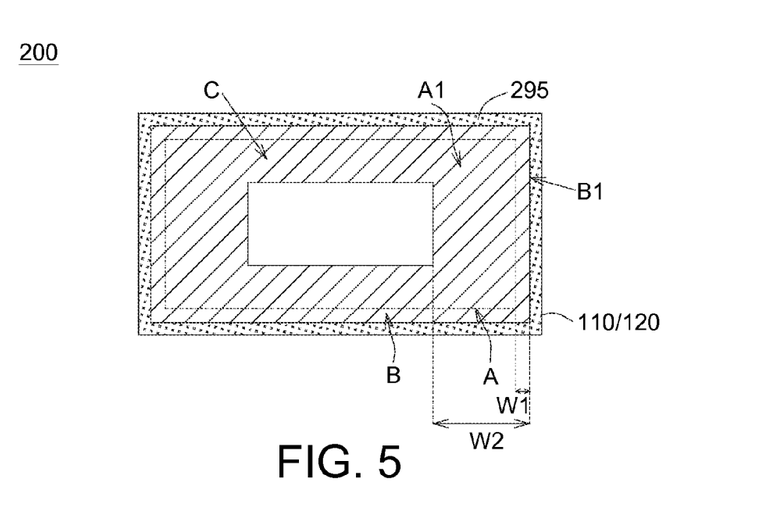
FIG. 5 shows a top view of a display panel according to another embodiment of the present disclosure.

FIG. 5 shows a top view of a display panel 200 according to another embodiment of the present disclosure. As shown in FIG. 5, the display panel 200 includes the first substrate 110, the second substrate 120, the liquid crystal layer (not shown), a shielding pattern C, and at least a reactive monomer. The reactive monomer refers to a material added into the liquid crystal layer, having specific functional group(s), i.e. acrylate group, and undergoing a polymerization reaction under irradiation with a light of specific wavelength ranges for forming a polymer structure. The first substrate 110 has at least one display region A and one non-display region B located outside the display region A. The second substrate 120 is disposed opposite to the first substrate 110. The liquid crystal layer is disposed between the first substrate 110 and the second substrate 120, and the reactive monomer is mixed in at least the liquid crystal layer. The shielding pattern C may be disposed on the first substrate 110 or the second substrate 120 and corresponding to the non-display region B and a margin portion A1 of the display region A adjacent to the non-display region B. That is, the shielding pattern C is located at the non-display region B and the display region A and extends from the inner edge of the seal 295 to the non-display region B and the display region A, while a shielding pattern located on or overlap the seal 295 or located outside the outer edge of the seal 295 (not shown) is not regarded as the shielding pattern C described in the present disclosure. Within a first region corresponding to the shielding pattern C, an aperture ratio of the first region is X %, the reactive monomer has a concentration of Y ppm, and X and Y satisfy the following formula: $2847.7e^{-3.6375X} > Y > 1774.1e^{-8.9014X}$. In an embodiment, a first region is covered by the shielding pattern C. In an embodiment, an aperture ratio of the first region is X %, the reactive monomer corresponding to the first region has a concentration of Y ppm, and X and Y satisfy the following formula: $2847.7e^{-3.6375X} > Y > 1774.1e^{-8.9014X}$. The aperture ratio refers to the ratio of the area of the effective region where a light can pass through to the area of the total region.

Figure 6:
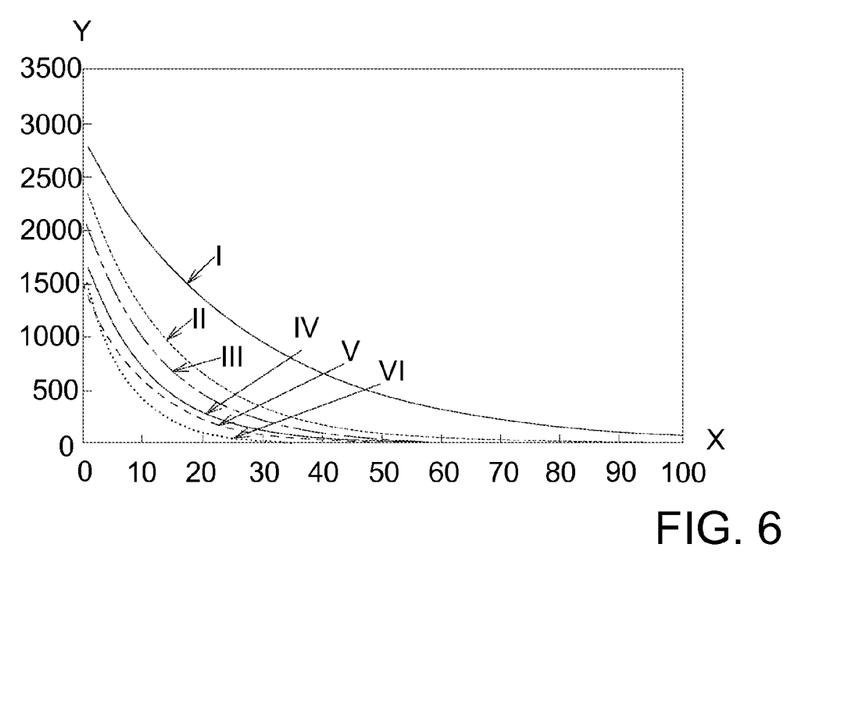
FIG. 6 shows relationships between aperture ratios of shielding patterns vs. concentrations of reactive monomers according to the embodiments of the present disclosure.

FIG. 6 shows relationships between aperture ratios (X) of shielding patterns vs. concentrations (Y) of reactive monomers corresponding to the shielding pattern C according to the embodiments of the present disclosure. In the embodiments, the concentrations of the reactive monomers refer to the amounts of residual reactive monomers, and the aperture ratios represent the light transmission. In FIG. 6, curves I, II, III, IV, V, and VI represent the relationships between aperture ratios (X) of shielding patterns and concentrations (Y) of reactive monomers with irradiation time durations of 30 minutes, 60 minutes, 90 minutes, 120 minutes, 150 minutes, and 180 minutes, respectively. As shown in FIG. 6, different aperture ratios may cause different amounts of residual reactive monomers. The longer the reaction time is, the less the amount of residual reactive monomers is. While the amount of residual reactive monomers is high, the image sticking phenomenon of display panels would be serious, and the qualities of the display images would be terrible.

Figure 7:
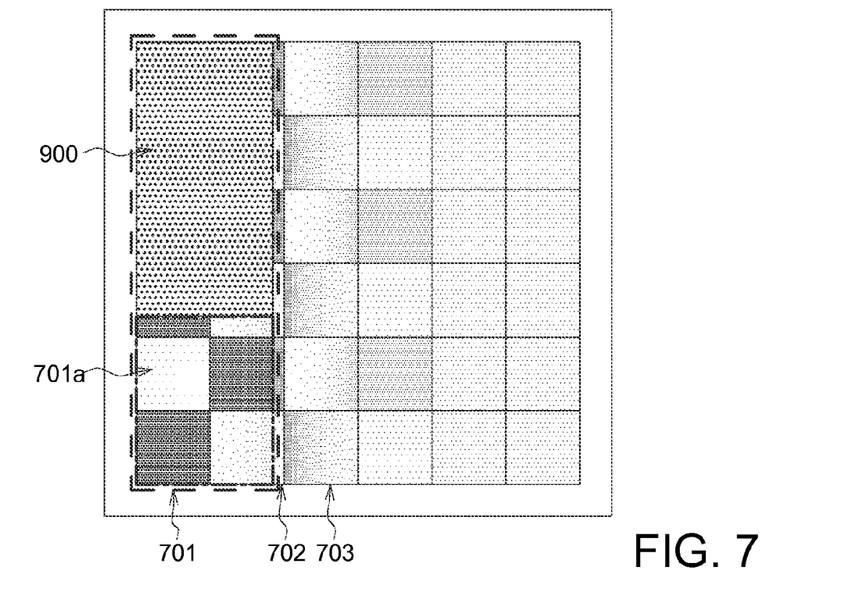
FIG. 7 shows a schematic diagram of aperture ratios of shielding patterns vs. image sticking phenomenon.

FIG. 7 shows a schematic diagram of aperture ratios of shielding patterns vs. image sticking phenomenon of a display panel. In FIG. 7, check patterns are used as the test image, wherein the check patterns are continuously shown for a period of time, the images of the checks are then set at the same gray level for comparing the image sticking phenomenon thereof. First, regions 701 of FIG. 7 are adhered with shielding films 900, and check patterns are displayed, wherein the shielding films 900 can be used to shield the irradiation by a light with a wavelength range (200-400 nm) for polymerization of reactive monomers. After a period of testing time, the images are set at the same gray level, and the shielding films 900 are removed from some of the regions, resulting in the pattern as shown by regions 701a. Since the aperture ratio of the region 701 is 0, the reactive monomers in the region 701 cannot absorb any light with a wavelength range capable of reacting the monomers for forming a polymer structure, such that a large amount of residual reactive monomers could cause very serious image sticking phenomenon in that region. While the aperture ratio of the region 701 is 0, and the aperture ratio of the region 703 is higher than that of the region 701, the region 702 located at the boundary between the regions 701 and 703 has an aperture ratio equal to that of the region 703. As shown in FIG. 7, it is apparent that the image sticking of the region 701 with an aperture ratio of 0 is very serious, in contrast, the image sticking of the region 703 having a higher aperture ratio is less serious. In addition, despite that the region 702 has an aperture ratio equal to that of the region 703, the image sticking of the region 702 is more serious than that of the region 703 due to the un-reacted reactive monomers diffusing from the region 701 to the region 702.

In an embodiment, while the un-reacted reactive monomers have a concentration of less than 400 ppm and larger than 0 ppm (0<Y<400), and the aperture ratio of the shielding pattern is larger than 10% and smaller than 100% (10≤X<100), the display panel 200 is provided with less image sticking, and hence has better qualities of display images.

In an embodiment, while the display panel 200 is a large-sized display panel, as shown in FIG. 5, the region covered by the shielding pattern C extends from a margin portion B1 of the non-display region B to at least part of the display region A. The margin portion B1 is adjacent to the seal 295. The shielding pattern C extends by a distance W2 of 10-15 time of a width W1 of the non-display region B.

In an embodiment, while the display panel 200 is a small-sized display panel, the region covered by the shielding pattern C extends from the margin portion B1 (that is, from the inner edge of the seal 295) of the non-display region B to at least part of the display region A, and the shielding pattern C extends by the distance W2 of about 3 cm. Alternatively, the region covered by the shielding pattern C extends from the two peripheries B1 of two opposites sides of the non-display region B to the display region A, and the shielding pattern C extends by a total distance of about 6 cm which is the sum of the two distances W2. In the embodiment, while the display panel 200 is a small-sized display panel, such as a cell phone display panel, the shielding pattern C may fully cover the non-display region B and the display region A.

Figure 8A:
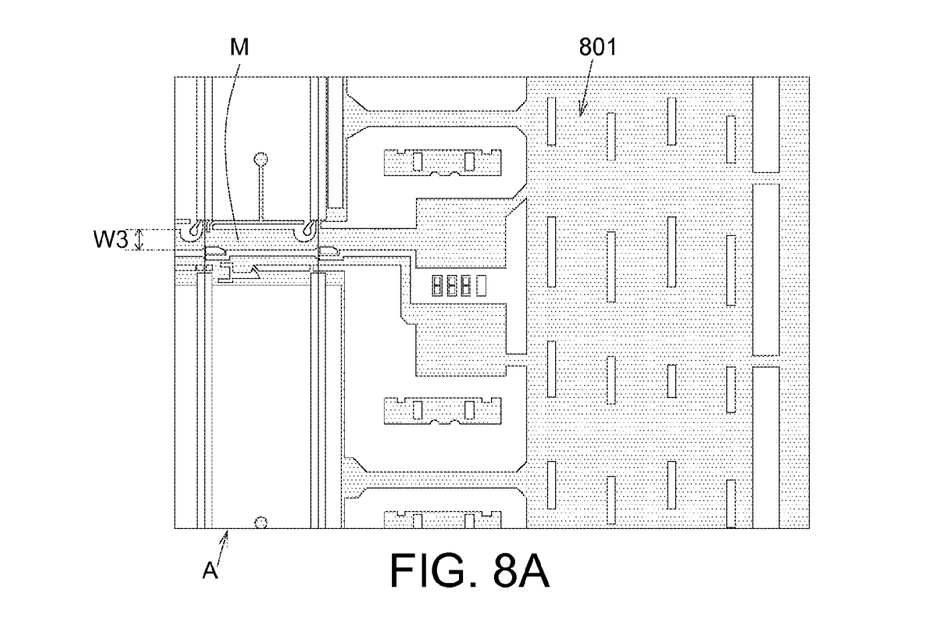
FIG. 8A shows a schematic diagram of a shielding pattern according to an embodiment of the present disclosure.
Figure 8B:
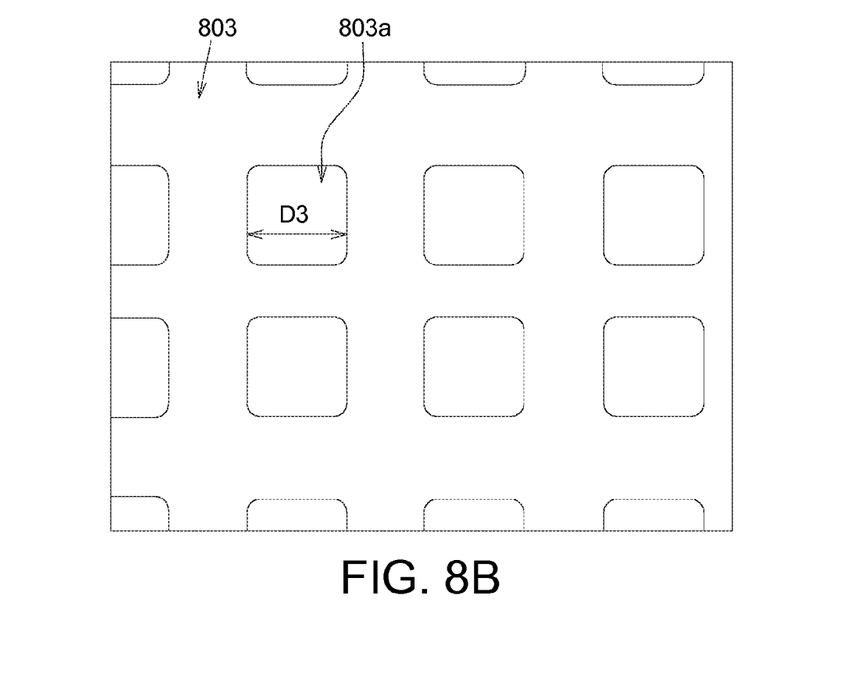
FIG. 8B shows a schematic diagram of a shielding pattern according to another embodiment of the present disclosure.

FIG. 8A shows a schematic diagram of a shielding pattern 801 according to an embodiment of the present disclosure, and FIG. 8B shows a schematic diagram of a shielding pattern 803 according to another embodiment of the present disclosure. In the embodiment, the shielding pattern may include a plurality of metal wires, a light shielding layer, of the combination thereof. As shown in FIG. 8A, the shielding pattern 801 includes such as a plurality of metal wires, and as shown in FIG. 8B, the shielding pattern 803 includes such as a shielding layer.

As shown in FIG. 8A, the metal wires M of the shielding pattern 801 located in a margin portion of the display region A have a line width W3 of such as smaller than 50 μm. The margin portion of the display region A is adjacent to the non-display region B.

As shown in FIG. 8B, the shielding pattern 803 is such as a shielding layer having a plurality of openings 803a of a size D2 of such as about 100 μm.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
a first substrate having a display region and a non-display region located outside the display region;
a second substrate;
a liquid crystal layer disposed between the first substrate and the second substrate;
a plurality of thin film transistors disposed on the first substrate;
a plurality of metal wires disposed on the first substrate;
a protection layer overlaying at least a portion of the metal wires;
a first alignment layer disposed on the protection layer and exposing a first surface of the protection layer;
a plurality of agglomerates disposed on at least a portion of the first surface; and
a light shielding layer disposed on the second substrate and corresponding to the non-display region, the light shielding layer having a light transmitting portion and a light shielding portion, wherein a first average surface roughness generated from the agglomerates corresponding to the light transmitting portion is higher than a second average surface roughness generated from the agglomerates corresponding to the light shielding portion.

2. The display panel according to claim 1, wherein the protection layer is in direct contact with at least one of the thin film transistors or the metal wires.

3. The display panel according to claim 1, wherein the protection layer comprises an inorganic dielectric material.

4. The display panel according to claim 1, wherein the first surface is corresponding to the non-display region.

5. The display panel according to claim 1, further comprising a plurality of photo spacers disposed between the first substrate and the second substrate for providing a gap for disposing the liquid crystal layer.

6. The display panel according to claim 1, further comprising:
an electrode layer disposed on the second substrate; and
a second alignment layer disposed on the electrode layer and exposing a second surface of the electrode layer;
wherein the agglomerates are further disposed on at least a portion of the second surface.

7. The display panel according to claim 1, wherein the display panel further having a plurality of nanogrooves disposed on a side of at least one of the metal wires in the non-display region.

8. The display panel according to claim 7, wherein the nanogrooves are disposed on at least an inclined surface of the metal wires.

9. The display panel according to claim 1, further comprising a plurality of submicron protrusions disposed in the non-display region, wherein the submicron protrusions are arranged along an extending direction of at least one of the metal wires.

10. The display panel according to claim 1, wherein the first average surface roughness generated from the agglomerates corresponding to the light transmitting portion is higher than a third average surface roughness generated from the agglomerates corresponding to the display region, and the third average surface roughness is higher than the second average surface roughness generated from the agglomerates corresponding to the light shielding portion.

11. The display panel according to claim 1, further comprising:
a seal disposed between the first substrate and the second substrate and located in a periphery area of the non-display region, wherein a fourth average surface roughness generated from the agglomerates correspondingly adjacent to the seal is higher than a third average surface roughness generated from the agglomerates corresponding to the display region.

12. A display panel, comprising:
a first substrate having a display region and a non-display region located outside the display region;
a second substrate;
a liquid crystal layer disposed between the first substrate and the second substrate;
a shielding pattern on the first substrate or on the second substrate, wherein the shielding pattern is corresponding to the non-display region and at least a portion of the display region adjacent to the non-display region; and
a reactive monomer mixed in at least the liquid crystal layer;
wherein an aperture ratio of a first region corresponding to the shielding pattern is X %, the reactive monomer corresponding to the first region has a concentration of Y ppm, and X and Y satisfy the following formula:

$$2847.7e^{-3.6375X} > Y > 1774.1e^{-8.9014X}, \text{ wherein}$$
$$10 \leq X < 100.$$

13. The display panel according to claim 12, wherein Y<400.

14. The display panel according to claim 12, wherein the first region covered by the shielding pattern extends from a margin portion of the non-display region to the display region, and the shielding pattern extends by a distance of 10-15 time of a width of the non-display region.

15. The display panel according to claim 12, wherein the first region covered by the shielding pattern extends from a margin portion of the non-display region to the display region, and the shielding pattern extends by a distance of about 3 cm.

16. The display panel according to claim 12, wherein the shielding pattern covers the non-display region and the display region.

17. The display panel according to claim 12, wherein the shielding pattern comprises at least one of a plurality of metal wires or a light shielding layer.

18. The display panel according to claim 17, wherein the metal wires located in a margin portion of the display region have a line width of smaller than 50 μm, the margin portion of the display region is adjacent to the non-display region.

19. The display panel according to claim 17, wherein the light shielding layer has a plurality of openings of a size of about 100 μm.

* * * * *